United States Patent [19]

Lockhardt

[11] Patent Number: 5,104,207
[45] Date of Patent: Apr. 14, 1992

[54] MEANS PROVIDING EASY EXTRACTION OF VIDEO CASSETTES AND THE LIKE FROM STORAGE JACKETS THEREFOR

[76] Inventor: Michael A. Lockhardt, R.F.D. #4, Box 48, Dover, N.H. 03820

[21] Appl. No.: 582,153

[22] Filed: Sep. 14, 1990

[51] Int. Cl.⁵ ............................................. A47B 88/00
[52] U.S. Cl. .................................... 312/319; 312/12; 206/387
[58] Field of Search ............... 312/12, 319; 206/387; 211/40, 41

[56] References Cited

U.S. PATENT DOCUMENTS

| | | | |
|---|---|---|---|
| 1,850,790 | 3/1932 | Cunningham | 312/12 |
| 4,046,255 | 9/1977 | Ackeret | 206/387 |
| 4,330,162 | 5/1982 | Aboussouan | 206/387 X |
| 4,702,533 | 10/1987 | Seifert | 312/12 |
| 4,715,669 | 12/1987 | Baillie et al. | 312/12 |
| 4,871,064 | 10/1989 | Hehn et al. | 206/387 |

*Primary Examiner*—Joseph Falk
*Attorney, Agent, or Firm*—Herbert L. Gatewood

[57] ABSTRACT

An extraction means is provided for use in combination with a protective jacket for a video cassette for easy removal of the video cassette from the protective jacket. A video cassette can be removed from its protective jacket without removal of that jacket from a storage device in which a plurality of video cassettes are stored in such a manner that the protective jackets are in side-by-side contact.

16 Claims, 4 Drawing Sheets

MEANS PROVIDING EASY EXTRACTION OF VIDEO CASSETTES AND THE LIKE FROM STORAGE JACKETS THEREFOR

BACKGROUND OF THE INVENTION (1). Field of the Invention

This invention relates, in general, to a means useful in facilitating the extraction or removal of video cassettes and the like from storage jackets therefor. In a further aspect, the invention relates to improved protective storage jackets for video cassettes and the like-shaped members provided with such an extraction means. Still further, the invention relates to a storage device or enclosing structure of relatively simple construction for storing a plurality of the improved storage jackets with video cassettes contained therein.

(2). Description of the Prior Art

Over the last several years, video cassette players/recorders ("VCRs") have become ever increasingly popular. Today, it is believed that over a majority of homes in the United States have at least one of such players/recorders. The popularity of the VCR has been accompanied not only with an ever increasing number of video cassette movies available for purchase or rent by the consumer but also in the recording by VCR owners of various movies presented on television for later playback. As a result, the VCR owner's library of prerecorded movies or the like on video cassette tapes is itself ever increasing. Some VCR owners have acquired libraries of prerecorded movies and other material of substantial size.

The popularity of VCRs is, perhaps, even exceeded by audio cassette players/recorders for audio tapes. And, it is expected that the popularity of the compact disc players/recorders will rival that of the audio cassette. As a result, music lovers and the like have accumulated libraries of prerecorded music on audio tape cassettes and compact discs. These libraries, like those of video cassettes, are ever increasing in size, and, in the case of some individuals, the libraries comprise substantially large numbers of audio cassette tapes and compact discs.

Nevertheless, whether an individual's library of video or audio cassettes, or compact discs, is of substantial numbers or not, it is desirable that the video and audio cassette tapes containing prerecorded material, or material recorded by the consumer, and compact discs containing such material, be stored in some organized fashion. As a result, a plethora of racks and other storage devices have become available to the consumer for the storage of the tape cassettes and compact discs. The storage devices are, in large part, of a box-like construction with an open front providing an internal rectangular-shaped compartment for location and storage of a predetermined number of tape cassettes or compact discs. The video cassettes in such storage devices are, in general, disposed vertically with respect to one another. These storage devices are, in some cases at least, adapted to be attached to a wall and in other cases are adapted to rest on top of a table, television cabinet, or other such supporting member. Some of the storage devices can be interlocked or nested together in a side-to-side horizontal manner, and in verticle fashion, superposed one above the other.

It is commonly known that dirt, dust and the like acts to damage blank tapes and to destroy the visual or sound qualities, or both, of the material recorded on the cassette tapes. Such destructive agents gain access to the tape, audio or video, through the tape access openings in the cassette. In the case of compact discs, it will be readily appreciated that the sound track is open to ruination by dirt and dust. As a result of such destructive agents being common to the environment during the marketing channels for such tapes and discs and in the home after purchase, such are generally sold, as is well known, in the case of video tapes, in a protective jacket, and in the case of audio tapes and compact discs, in a clear plastic box providing complete enclosure of the tape or disc. The blank tapes and discs are, in general, kept by the consumer in such protective jackets and enclosures, until desired to be used for recording a movie or music. At such time, the plastic or other wrapper is removed from around the jacket, etc. and the blank tape removed from the protective jacket or other enclosure. Subsequent to recording of the movie, for example, the video cassette is then placed by the consumer back into the protective jacket until desired to view the movie at a later time. Pre-recorded movies and music are, in general, handled in the same manner, whether or not such cassettes are to be stored in a storage device for a predetermined number of the video or audio cassettes. The protective jacket in which a video tape cassette is sold provides not only protection against dust, etc., it also serves to protect the tape cassette and tape from being damaged while in the channels of trade. And, it serves a similar purpose after purchase.

The protective jacket for a video cassette is constructed, in general, from plastic, or heavy paper coated so as to be printable thereon with various illustrations, designs, text, etc. These jackets are of an elongated rectangular shape, as is believed well known, and are open at one elongated end, i.e. the front, so that the tape cassette can be extracted from and placed back into the internal storage compartment provided by the jacket, as desired. The jacket's internal dimensions are closely that of the tape cassette and the back planar surface of the cassette, i.e., the surface opposite from that of the tape access opening, to which an identifying label is typically attached, is essentially in the same plane as that defined by the open front of the protective jacket. Because of such construction and dimensions, somewhat of a problem is presented in extracting or removing a cassette from its protective jacket, as it is difficult to grasp the back edge of the cassette with one's fingers in order to extract it from the jacket. As a result, the two elongated edges of the jacket, at the front open end, are, in some cases at least, provided with opposed indentations or cut-outs along their length, to enable one to grasp the back edge of the cassette with one's fingers, aiding withdrawal of the tape cassette from the jacket. Although such cut-outs enable one to withdraw a particular video cassette from its protective jacket with relative ease, the cut-outs provide no help at all where a predetermined number of such video cassettes are stored in vertical disposition, for example, in their jackets, side-by-side, in a storage device therefor. The next adjacent jackets, in such a case, are in substantial contact with one another, making it most difficult, if not impossible, for one to grasp any particular cassette or jacket with one's fingers so as to be able to remove such a cassette, or the protective jacket containing it, from between the next adjacent protective jackets. As a result of this problem, or its potential, storage devices for a library of a predetermined number of cassettes have been typically provided with dividers or separating means so as to provide individual storage compartments for each video cassette and its protective jacket. These dividers are, in general, of such a depth that each falls short of the edge of the front opening of the protective jacket, providing the next adjacent jackets a distance spaced apart from one another sufficient to allow a particular jacket to be readily grasped by one's fingers and extracted with included cassette from the library of cassettes. Where the protective jacket is provided with the opposed cut-outs, as earlier-mentioned, the video cassette can then be readily removed from the jacket. Otherwise, the consumer is then still presented with the problem of not being able to readily grasp the back edge of the cassette with appropriate fingers for extracting the cassette from the protective jacket.

Moreover, although the divided storage devices, earlier disclosed, quite adequately, in most cases, serve their intended purpose, such storage devices require a greater volume in the storage compartment than is necessitated by the mere volume of the cassette tapes, if stored in their protective jackets in side-by-side contact with one another. Although such additional volume may present little of a problem in the case of libraries with a relatively small number of video cassettes, the problem is of some concern where a library contains a relatively large number of tape cassettes, due to the wasted space necessitated in the construction of the storage device. The problem of wasted space is made even greater where a plurality of such divided storage devices are arranged in horizontal side-by-side fashion and superposed one above the other in vertical rows, particularly where one's available space for a library of tapes is somewhat limited. Perhaps even more importantly however, the manufacture of cassette storage devices provided with dividers is necessarily somewhat more costly than such storage devices would be if the dividers could be left out because such were not required in the storage device for facilitating removal of a particular cassette from the library.

Sometimes, the consumer removes a video cassette from its protective jacket and stores the cassette, particularly after such has been used to record a movie or the like, in another, book-like enclosure provided for cassette storage. Such a storage device is somewhat larger than the protective jacket and provides, on being opened, an internal storage compartment for the tape cassette. This type of storage device offers good protection to the cassette tape against dust, or other damage, and allows easy extraction of the tape cassette. Nevertheless, the book-like storage device presents the same problem in removal of any particular cassette from a library thereof as does the protective jacket. If they are stored together, a particular storage device cannot be readily grasped by one's fingers for removal from between next adjacent storage devices. Accordingly, typically the storage device for a library of such protected cassettes is provided with dividers so as to space the next adjacent individual cassette book-like storage devices from one another, enabling the grasping by one's fingers of a particular storage device containing the movie desired. Nevertheless, the somewhat larger overall size of such a storage device, when compared to that of the protective jacket in which the tape cassette is provided, when purchased, necessitates a somewhat larger library storage space. Thus, a storage device for a library of a certain number of cassettes (in the book-like storage device) will need either be somewhat larger if the same number of cassettes are desired to be stored as a unit, e.g., a library of 6 cassettes, or the number of cassettes in such a library will need be fewer, e.g., only 5 cassettes, if the dimensions of the storage device are to remain the same as that for cassettes stored merely in the protective jacket in which they were purchased. Furthermore, while these book-like storage devices provide relatively easy extraction of the cassette from such a device, their use is attendant with other problems and disadvantages. The manufacture of such a storage device is relatively costly and where such is used the original protective jacket is discarded by the consumer, as such is no longer needed. Moreover, the internal storage compartment provided is considerably larger than the cassette resulting in wasted space in each. Further, the extraction of a cassette from such a storage device requires that such, if stored along with other cassettes in a larger storage device for a predetermined number of cassettes, be totally removed therefrom, in order to open the device for removing the cassette.

Other storage devices for a library of tape cassettes, or compact discs, are also known. The storage devices are somewhat similar in construction to the conventional one drawer file for storing papers. Such storage devices typically comprise an enclosure of rectangular shape defining a rectangular shaped internal compartment for location of a drawer which may be pulled out from, and pushed back into, the storage compartment, as desired. The drawer may provide for storage of one or more rows of a predetermined number of tape cassettes or discs. The cassettes or discs are typically stored laying down, in horizontal fashion, and one next to the other, sometimes in "individual compartments" provided by dividers located in each row of the drawer.

As a result of the difficulties presented in removing a video cassette from the conventional protective jacket provided with the cassette, as above pointed out, others heretofore have addressed this problem. Thus, in U.S. Pat. No. 4,265,369 there is disclosed a storage apparatus or dispenser for storing a pre-recorded program tape cartridge which comprises a box-like construction having one side open and which provides an entrance into the internal storage compartment. The tape cartridge is slidable into, and out of, the storage compartment through the front opening. An actuator mechanism is mounted to the internal backside of the compartment having spring bracing means for forcibly urging a stored cassette out of the storage compartment. The actuator means is made operable by a finger operated lever means connected operatively therewith which extends outwardly from the storage cavity. The lever means is pivoted at its mid-section and has a latch at the end opposite the protruding finger engaging end. The latch engages with a catch on the actuator mechanism which is forced rearwardly into the storage compartment on slidably inserting a cassette. On operation of this lever means the springs associated with the actuator mechanism operate to forcibly urge a push plate toward the front opening which, in turn, causes the tape cartridge to be pushed forward. Thus, the back edge of the tape cartridge clears the front opening of the storage device. The cartridge then can be readily grasped by one's fingers and slidably removed from the storage compartment.

U.S. Pat. No. 4,339,162 discloses an elongated rectangular-shaped storage box for use in storing video cassettes in upright manner. The storage device or box provided offers, according to the patentee, quick and easy removal of a video cassette from the storage device. The box is of one piece construction with an open front for accessing the storage compartment which is disclosed to be only slightly larger than the normal size video cassette. The storage box is provided with a slidable tray having a tab at the front end which extends outwardly from the front opening of the storage box, and which has a handle portion for easy grasp by the user of the storage device. The slidable tray is provided at the other end with an upwardly extending tongue which engages with the rearmost corner of a cassette. Thus, when the cassette is loaded into the storage device it is located on the slidable tray and that tray slides backwardly into, and to the rear of, the storage box, as the cassette is pushed into the storage compartment. When it is desired to remove the cassette, the tab is gripped by one's fingers and pulled in a direction directly outwardly from the storage box whereby the slidable tray with the cassette located thereon is moved outwardly, clearing the edges of the storage box, at the open front. The cassette can then be readily grasped by one's fingers and removed from the storage box.

Further, in U.S. Pat. No. 3,904,259, which issued Sept. 9, 1975, there is disclosed a magnetic tape cassette storage container in which the cassettes are each stored in individual compartments and, thus, protected from dirt, dust and the like. Each storage compartment has a rectangular-shaped internal storage cavity in which is provided on the rear wall thereof an ejection spring which facilitates the removal of a tape cassette. When the cassette is put into the storage compartment, the ejection spring is compressed and held in that position by a door to the storage cavity. On opening the door to remove the cassette, the ejection spring moves the cassette housed in the compartment outwardly by an amount adequate to allow the cassette to be grasped by the fingers of the person desiring the cassette.

Although the construction of the tape storage containers disclosed in the above-mentioned patents may be found to facilitate the removal of a tape cassette from its storage compartment, the use of such is believed attendant with certain disadvantages. The construction of each of such storage containers, as will be appreciated, is relatively complex, compared to that of the protective jacket which video tape cassettes, whether blank or containing prerecorded movies or the like, are typically sold. Accordingly, it is believed obvious that the cost of such storage devices for video casettes will be substatially greater than that of the conventional rectangular-shaped, open front, protective storage jacket.

Thus, there remains a need for a means for storing video cassettes and the like which not only provides good protection to an individual tape against dust, dirt and other damage but also allows simplicity in construction and easy extraction of the cassette from its storage device, and at reasonable cost. Further, there is a need for a means for storing and maintaining a library of a predetermined number of cassettes in the most compact manner.

SUMMARY OF THE INVENTION

A primary object of the invention disclosed herein is to provide a means facilitating the extraction or removal of a video tape cassette or other member from a closely fitting, protective storage jacket therefor.

Another object is to provide a means for facilitating the extraction of a video cassette or other such member from a storage jacket which is of simple construction.

A further object of the invention is to provide a means facilitating the extraction of a video cassette from its storage container or box which can be readily combined with a conventional open front storage jacket in which video cassettes are typically now sold.

A further object is to provide an improved open front storage jacket for video cassettes offering ease in removing a video cassette from the internal storage compartment.

A further object of the invention is to provide a protective storage jacket for video cassettes which is of simple and economical construction and which offers facility in removal of a video cassette from its internal storage compartment.

A still further object is to provide an improved storage jacket for video tape cassettes which closely fits the cassette and allows compact storage of a number of the video cassettes in a storage device.

Still another object of the present invention is to provide a video cassette extraction or removal means which can be readily combined by the video enthusiast with an existing, conventional rectangular-shaped open front storage jacket for a video cassette whereby such a video cassette can then be readily and easily removed from the jacket.

A still further object of the invention is to provide an improved protective storage jacket for a video cassette which allows the video cassette to be easily and readily removed therefrom and a library thereof to be stored in a more compact space.

A still further object is to provide an improved protective storage jacket for a video cassette whereby removal of the video cassette from the storage jacket is facilitated when a plurality of such video cassettes are stored in a storage device therefor and the storage jackets are so disposed in verticle fashion that their side walls are in abutting relationship one to another making difficult the grasping of the video cassette with one's fingers.

A still further object of the invention is to provide an extraction means which facilitates the removal of a video cassette from a conventional rectangular-shaped protective jacket whereby better use can be made of such a cassette storage means.

An even further object is to provide a storage device for a library of a predetermined number of video cassettes and their accompanying protective jackets which allows the library of cassettes to be stored in a compact manner and without wastage of storage space.

Thus, there is provided in accordance with the broader aspects of the invention a means providing greater ease in extracting an object from a close fitting protective jacket therefor having an open front, said means comprising an elongated, first planar flexible member of predetermined length having a rectangular-shape defined by inner and outer planar surfaces and first and second ends parallel to one another, and a second planar flexible member having a rectangular shape defined by inner and outer planar surfaces and by first and second ends parallel to one another and being of the same predetermined length as the said first-named planar member, the said first-named planar member and the said second planar member being juxtaposed to one another so that the outer planar surface of the said first planar member is in opposition to the inner planar surface of the said second planar member, means fixedly connecting together the said first and second planar members at said first ends and leaving such free to move away from one another at their second ends, said extraction means further comprising a third elongated planar member of predetermined length having a rectangular shape and being defined by upper and lower planar surfaces and by first and second ends, said third planar member being connected at its second end to said second planar member at its second end whereby on pulling the said third planar member at its first, free end, while the said first planar member is held fast at its free end, the said first and second planar members can be separated from one another and, on release of the said free end of the said third planar member, the said first planar member and said second planar member will tend to close on one another.

BRIEF DESCRIPTION OF THE DRAWINGS

For a better understanding of the invention, reference should be had to the following detailed description of the preferred embodiments of the invention which is to be read in conjunction with the accompanying drawings, in which.

DETAILED DESCRIPTION OF THE DRAWINGS AND THE PREFERRED EMBODIMENTS OF THE INVENTION

Figure 1:
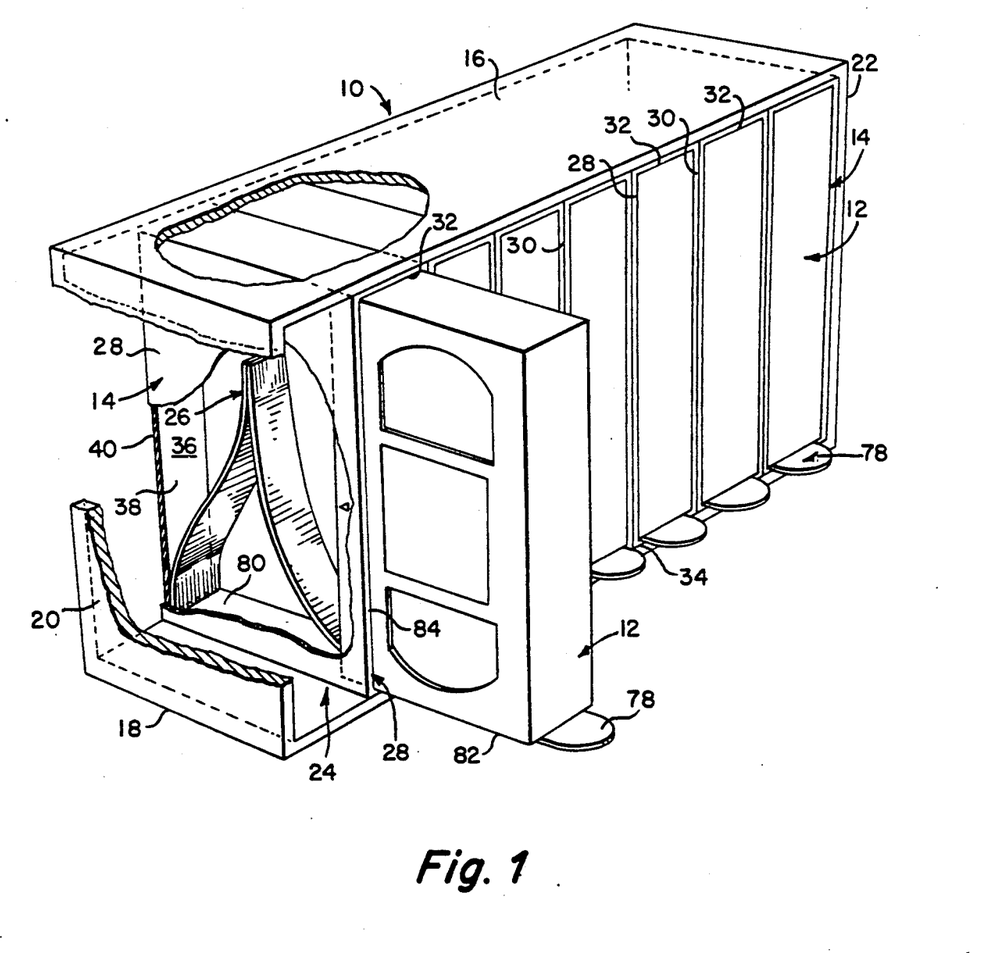
FIG. 1 is a view in perspective showing a plurality of video tape cassettes each in the protective storage jacket in which it was purchased, stored side-by-side in vertical disposition in a storage device therefor, and which shows a cut-away view of one of the storage jackets disclosing a cassette extraction means according to the invention in operative combination with the protective jacket.

Turning now to the drawing, there is shown in FIG. 1 thereof a rectangular-shaped, box-like storage device 10 in which is located a library of video cassette tapes 12, each in a protective storage jacket 14. The storage device 10 is defined by spaced-apart upper and lower planar surfaced members or panels 16, 18, parallel to one another, and planar, parallel side members or panels 20, 22 which are spaced apart from one another and which intersect and connect with the upper and lower surfaces to define a rectangular-shaped internal storage compartment or cavity 24. Storage device 10, in the device shown in FIG. 1, is open at the front and rear whereby a video cassette tape storage device of most simple construction is provided, according to one aspect of the invention.

Storage device 10 is of relatively rigid construction whereby it will retain its rectangular shape even with no video cassettes 12 stored therein. The storage device 10 can be set on any planar surface such as the top of a TV-cabinet or a table. Nevertheless, the storage device 10, as shown, may be more desirably located on a vertically disposed wall or other such surface. In that case, the wall will, in effect, provide a back surface or closure for the open back of the device 10 shown in the drawings. The storage device 10 can be mounted to the wall by various conventional fastening means well known to those skilled in the art. For example, conventional eye means can be provided on the back edge of the upper panel 16 for nails or screw type fasteners, provided in suitable spaced apart locations in the wall. Or two headless nails provided in spaced-apart predetermined locations in the same horizontal plane and adjacent the inner surface of the side panels 20, 22 can be used to merely rest the underside of the upper panel 16 thereon. Such fastening means and techniques for the location of the storage device 10 on a wall are well known and form no part per se of the invention disclosed herein. Instead of being fastened to the wall, the storage device 10 can be, if desired, merely placed on conventional shelving attached to the wall. In some cases, for example if the storage device 10 is a free standing unit on a TV-console, it may be desirable for aesthetic reasons to provide a back on the storage device 10.

The thickness of the upper and lower members 16, 18, and side members 20, 22, will be determined somewhat by the size of the storage device 10, i.e., how many video cassettes are to be stored therein. These members should, however, be relatively inflexible. The back member, if one is provided, need not be as thick as the other members as such is not intended to be a load bearing member. Nevertheless, it may help to provide some rigidity to the storage device.

As shown in FIG. 1, the internal storage cavity 24 of storage device 10 is of sufficient size and dimensions to store eight video cassette tapes therein (one having been removed for purposes of greater clarity in the disclosure of this invention) each of which is housed within a storage jacket 14 in which such was originally purchased. It will be appreciated, however, that storage device 10 can be of such dimensions as to house a smaller or larger number of video cassettes as desired. The next adjacent protective jackets 14, as shown in FIG. 1, are so close together that the opposed planar surfaces of such jackets, as later identified, are in contact with one another whereby the library of cassette tapes 12 occupies the minimum amount of storage space. The internal storage cavity 24 is so dimensioned that its volume is only slightly greater than the combined volume of the video cassettes 12 and their protective jackets 14, shown in the drawing. The protective jackets 14 (and enclosed cassettes) are located in storage device 10 in verticle disposition, as shown in the drawing. The width dimensions of the storage device 10 are only such as to accommodate a predetermined desired number of video cassettes 12 in their protective jackets. Thus, storage device 10 can be of relatively simple construction and need not be provided with dividers providing for individual storage of video cassettes, spaced apart from one another so as to enable one cassette to be more easily withdrawn from next adjacent ones on each side. Such more elaborate and costlier construction, i.e. providing for dividers, as now typically provided, is made totally unnecessary by the extraction means 26 of the invention, as will be made more clear hereinafter. Although not shown in the drawings, it will be appreciated that storage device 10 can be constructed so that the video cassettes 12 are stored in horizontal manner, if desired, rather than vertically. In such a case, side panel or wall 20, as now shown in FIG. 1, can function, for example, as the lower or base member for supporting the storage device.

The storage devices 10, as will be appreciated, can be stacked vertically on top of one another in superposed fashion and can be located side-by-side in horizontal fashion. Thus, as one's library of video cassettes increases, storage devices 10 can be added as and when desired, or needed. Importantly, the storage device 10 allows for the storage of video cassettes 12 in the most compact arrangement. Although not shown, if desired, each storage device 10 can be provided, according to conventional techniques, with mating, interlocking means so that a number thereof can be connected together and provided in a relatively compact space. Such interlocking means are deemed well known, for example, dovetail means. With such interlocking means one member thereof can be provided on the top surface of upper member 16 of a storage device 10 and the other mating interlocking member of the dovetail can be provided on the bottom planar surface of the lower member 18. Thus, a plurality of storage devices 10 can be superposed, one above the other and next adjacent ones vertically interlocked together. In similar fashion, the one member of the dovetail can be provided on the outside surface of side panel 20 of a storage device 10 and the matching member of the dovetail provided on the outside surface of side panel 22. Thus, the storage devices can be interlocked together horizontally, if desired. Two such dovetail members will be desirably provided on each surface, in suitable spaced apart locations, to provide somewhat greater stability to the stacked and interlocked storage devices.

The storage device 10 can be constructed of various materials, as desired, for example, wood, pressed wood particles or laminations with decorative surfaces, plastic, metal, or combinations thereof. Various conventionally known plastic compositions can be used in the manufacture of storage device 10, if such is to be made of plastic, e.g., polyvinyl chloride compositions. These can be formulated according to usual techniques to provide any stiffness or flexibility, or other physical characteristics desired. The formulations can be composed of suitable coloring agents to provide the color or colors most aesthetically appealing. Thus, storage device 10 can be manufactured according to various conventional plastic molding techniques, e.g., injection molding. Where of plastic the various members comprising the device 10 can be provided as an integral unit during molding or the various members can be molded individually and then assembled into a unit, as desired. In that case, the members can be connected together by various means known, e.g. by adhesive or conventional mechanical fastening means.

In the event the storage device 10 is of wood, the upper and lower members, and side members can be pre-assembled together or can be sold in kit form for later assembly by the buyer. The components, in such a case, can be glued or otherwise conventionally fastened together e.g. by mechanical fasteners, screws, nails, etc. Where the components comprising storage device 10 are individually manufactured, rather than being molded out of plastic as an integral unit, the upper and lower members 16, 18, for example, will overlap the side panels, allowing for fastening of the various members together.

Figure 2:
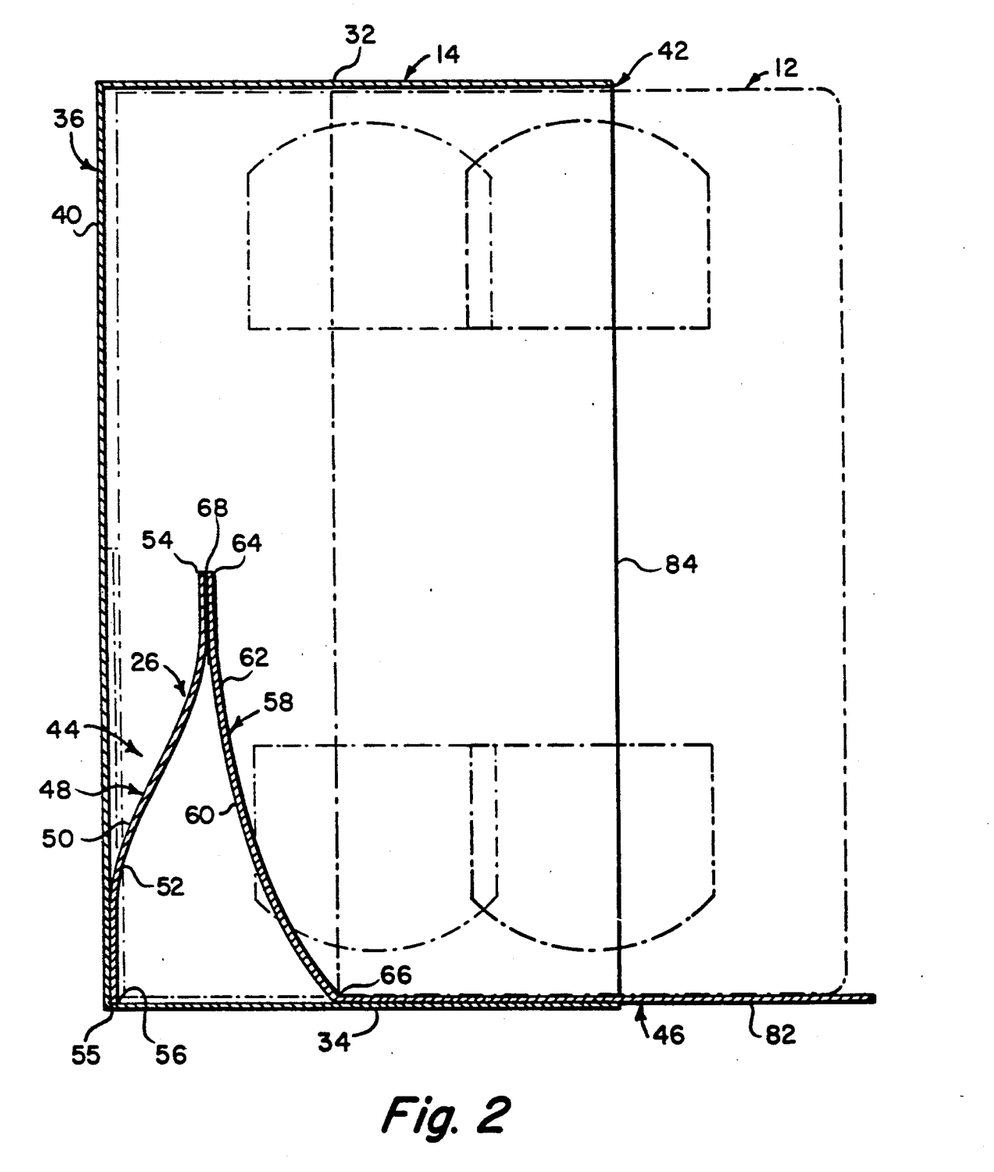
FIG. 2 is a side view of a conventional open front protective jacket used in the sale and storage of video tape cassettes with a side panel or wall of the jacket removed and showing an extraction means of the invention in combination with the jacket and a side view of a video tape cassette shown in phantom which has been caused to move toward and and out of the open front of the jacket by operation of the extraction means.
Figure 3:
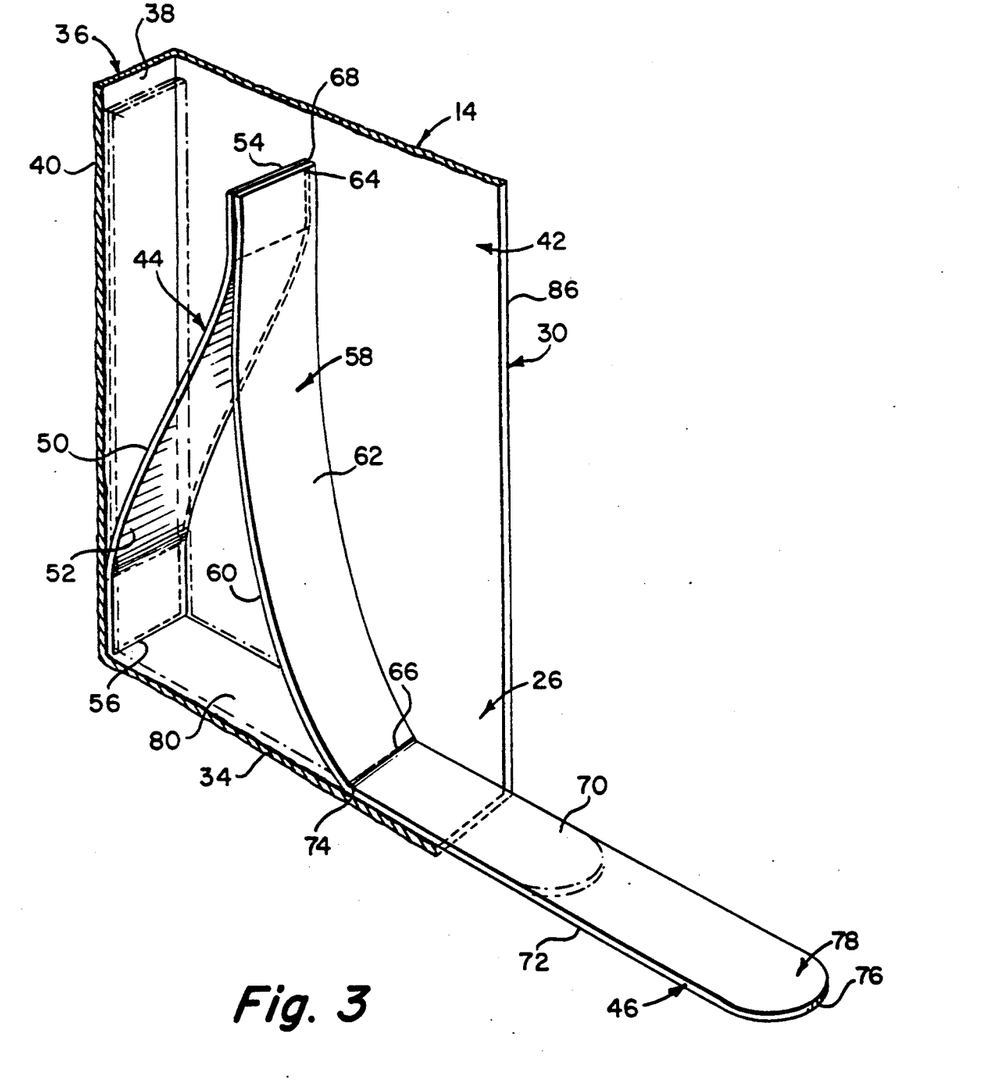
FIG. 3 is a view in perspective of a cutaway of a portion of a conventional open front protective jacket for a video cassette and showing an extraction means according to the invention disclosed herein operatively connected thereto, such extraction means being in its open or extended position.

As shown in the drawing, particular attention being paid to FIGS. 2 and 3, protective storage jacket 14 has in combination therewith an extraction means 26 according to one aspect of the invention. Storage jacket 14 is of box-like rectangular-shape defined by parallel planar, spaced-apart side walls 28, 30, parallel, planar, spaced-apart top and bottom members 32, 34 and planar, end closure member 36 defined by inner planar surface 38 and outer planar surface 40 parallel thereto. The storage jacket 14 is open at the front end defined by the front edges of the side walls and top and bottom members, opposite closure member 36, as indicated generally by reference numeral 42, to allow a video cassette 12 to be placed within, and retrieved or removed from, the internal storage cavity defined by the open front 42 of the storage jacket. The video cassette 12 is of conventional rectangular-shape having an overall thickness substantially less than that of its length and width and, as conventional, occupies substantially the entire storage cavity in the protective jacket. Thus, a somewhat snug fit is provided, between the rectangular-shaped storage cavity and the cassette 12. Nevertheless, the cassette 12 is sufficiently free from the confines of the storage compartment so that it can be readily removed from, or replaced therein, in sliding fashion.

The extraction means 26 comprises a spring-like member or component 44 and an elongated pull or slide member 46 of planar configuration facilitating the sliding of the video cassette 12 out of the protective jack's storage cavity, as later made more clear. See FIGS. 2 and 3. Spring-like member 44 comprises, in combination, a first rectangular-shaped member 48 of a predetermined length defined by planar inner and outer surfaces 50, 52 and first and second ends 54, 56, parallel to one another, and a second rectangular-shaped planar member 58 of the same predetermined length as the first planar member 48. The rectangular-shaped member 58 is defined by inner and outer planar surfaces 60, 62 and first and second ends 64, 66 parallel to one another. As will be seen more clearly by reference to FIG. 2, the planar members 48, 58 are connected together adjacent their respective first ends so that the outer planar surface 52 adjacent first end 54 is in intimate contact with and fixedly connected to the inner planar surface 60 adjacent first end 64 for a predetermined distance inwardly, as shown in the drawing, from the said first ends. The second ends of the planar members 48, 58, i.e., the bottom or lower ends as shown in FIG. 2, are unattached relative to one another, and are free to be moved away from one another from a closed position, i.e., whereby the outer surface 52 and the inner surface 60 adjacent the respective second ends are in close proximity to one another, if not in contact, to an open position, as shown in FIGS. 1-3 of the drawings. In the closed position, the outer and inner surfaces of the planar members 48, 58, respectively will desirably be substantially in contact with one another along their lengths, the reason for such being explained more fully hereinafter.

The distance inwardly from ends 54, 64 that planar members or components 48, 58 will be connected together may vary, depending somewhat upon the length of these planar members, the material of construction and the flexibility thereof. The main consideration is that such members be connected together to such an extent along their lengths that the remaining portions of the lengths of each member not connected together be characterized with such flexibility that, when the second ends of such members are in the open position, and the members are bent from their initial vertically disposed planar position, as in FIG. 4, the members 48, 58 want to return to the vertical disposition.

The planar members 48, 58, shown in FIGS. 1-3, are connected together by an adhesive layer 68; however, as later more fully disclosed, other connection or fastening means can be used, if desired. The particular adhesive or other fastening means used will depend somewhat upon the material of construction of the extraction means; however, the selection of such is believed well within the skill of those in the art.

The pull or slide member 46, as shown in the drawing, is connected to the second rectangular-shaped member 58 of the spring-like component 44 at its second or lower end 66. The slide member 46 is of a rectangular shape and is defined by upper and lower planar surfaces 70, 72 and inner and outer ends 74, 76. End 76 can be rounded, as shown in the drawings, or straight, as desired. The length of slide member 46 need be long enough so that, when the spring-like component 44 is in its retracted or closed position, the slide member 46 extends outwardly from the front edges of the side walls 28, 30 of the protective jacket 14. The distance which slide member 46 extends outwardly from the front side walls can vary somewhat. The important thing is that a tab 78 be provided that can be readily grasped between the thumb and index or other finger of one's hand. Thus, the extraction means 26 can be made to operate, as later described.

The slide member 46 is connected to planar member 58 in such a fashion as to be in a plane perpendicular to that defined by member 58 when the spring-like component 44 is in its retracted, or closed, position against the inside surface 38 of end closure 36. The slide member 46 need not necessarily be of the same material as the planar members 58, 60 of the spring-like component. Neither is there any particular requirement that it be flexible. The main requirement is that such a member be of a material that allows member 46 to readily slide relative to the inside planar surface 80 of the bottom member 34 of the storage jacket. The slide member 46 can be connected to planar member 58 by various means, e.g., an adhesive tape bridging the ends 66, 74 (not shown). The connecting member need not, however, be provided with an adhesive layer. Various known mechanical fastening means can be used instead, if desired. The main requirement is that such a bridging member be sufficiently flexible as to allow the slide member 46 and member 58 to be bent relative to one another in the operation of the extraction device.

The extraction means 26 can be installed in a protective jacket 14 to provide an improved protective jacket for video cassettes when sold, as shown by the protective jacket 10 in the drawing, or the extraction means can be separately sold, to be installed by the video enthusiast. In the latter case, the consumer can then retrofit, as desired, any previously acquired protective jackets of the type shown in the drawings, but not containing an extraction means according to the invention.

The extraction means 26, as will be seen by reference to FIG. 2, is installed in protective jacket 14 in such a manner that its inner planar surface 50, adjacent to the lower or second end 56, is fixedly connected to the inner planar surface 38 of the end closure 36, at its lower or bottom edge. This can be accomplished by various means, e.g., adhesive or mechanical fastening means, a suitable adhesive being preferred. In the case of extraction means 26 being individually sold for retrofitting of existing protective jackets, an adhesive layer having a conventional release layer on one side can be applied to the planar surface 50, according to usual techniques. Thus, the consumer can remove the release layer (not shown in the drawing) and apply the inner surface 50 against the inner surface 38 to adhesively secure the two layers together. The width of the adhesive layer 55, i.e., the distance such extends upwardly on the inner surface 50, can vary somewhat, depending upon the length of member 58 and its flexibility. The length of inner surface 50 that is free should be such as to allow the good operation of the spring-like component, yet provide a satisfactory connection to the end closure 36.

Once installed in a jacket 14 the extraction means 26 can be operated to facilitate the removal of a video cassette 12 from the close fitting storage compartment 24. Thus, when a particular video cassette 12 is desired for play, the party desiring such a cassette merely grasps with his thumb and index finger the tab 78 of the extraction means 26 fixedly secured to the jacket 14 containing that video cassette. He then pulls the tab 78 in a direction horizontally outwardly from the storage compartment. This causes the sliding member 46, with the bottom planar surface 82 of the video cassette resting on the upper planar surface 70 of the sliding member, to be pulled outwardly toward the open front end of the jacket, as shown in FIG. 2. In doing so, the bottom planar surface 72 of the sliding member 46 slides along on the inside planar surface 80 of the bottom member of this protective jacket. The planar member 58 of the spring-like component 44, against which the front edge, i.e. the tape access edge, of the cassette 12 is located, acts in combination with the sliding member 46 to cause the tape cassette 12 to be moved forward out of the protective jack's storage compartment a sufficient distance and the rear edge of the cassette (FIG. 2) to clear the front edges 84, 86 of the protective jacket defining the open front of the jacket. Thus, the back edge of the cassette 12 can then be grasped by one's fingers and fully removed from the protective jacket. When the cassette 12 is removed from the sliding member 46, the spring-like member or component 44 of the extraction means 26 causes the sliding member 46 to be retracted into the storage compartment to its closed, or at rest, position. Thus, the members 48, 58 will be vertically disposed and in planes essentially parallel to that defined by end closure 36. The tab 78 will extend outwardly from the protective jacket 14, as seen in FIG. 1.

When finished viewing the video cassette 12, the party viewing such will place it back into the empty protective jacket 14. On so doing, the tape access face of the cassette will be located directly against the outer planar surface 62 of the planar member 58 so that the cassette can then be later removed for viewing, as desired, the removal being facilitated by the extraction means 26 of the invention.

Over an extended period of time, the spring-like member 44 may lose some of its flexibility. Nevertheless, such will not have any effect upon the ability of the extraction means 26 to facilitate the removal of a cassette from its protective jacket. Such a loss in flexibility may, however, reduce somewhat the ability of the spring-like component to return to its original, more preferred vertical disposition. If such occurs, however, on again placing the cassette back into the protective jacket, the pushing of the video cassette into the jacket will cause the component of the spring-like member to return to the vertical position.

Although somewhat less preferred, the spring-like component 44 can be replaced with a component of the construction shown in FIG. 1 but with planar members 48, 58 of material offering little springiness or flexibility, if any, except that which will allow the members to be bent out of shape, as shown in FIG. 2. Such an extraction means will still function, though less desirably, to facilitate removal of the cassette from the protective jacket. The components of the member 44 should each, however, have sufficient body, i.e., not be so flimsy, that the members 48, 58 will not fold upon themselves and tend to lay down flat on the inner bottom surface 80 of the jacket. The member 58 need be at least vertically disposed sufficient that it offer some resistance against the cassette when such is being placed back into the jacket. Otherwise, the cassette may not cause the members 48, 58 to be pushed back into the vertical position whereby to "reset" the extraction means for again facilitating removal of the cassette from the storage jacket.

Figures 4, 5:
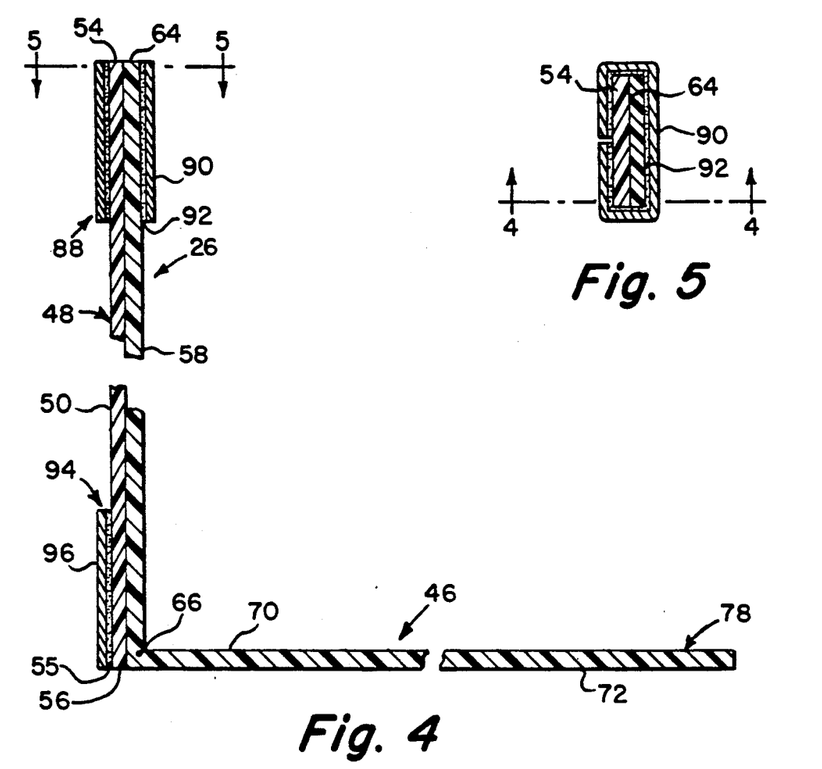
FIG. 4 is a side view in cross-section of an extraction means according to another aspect of the invention, the said extraction means being in its closed or inoperative position.
FIG. 5 is a sectional view looking down on the extraction means shown in FIG. 4.

Turning now to FIGS. 4 and 5 there is disclosed another construction of the extraction means 26 according to another aspect of the invention. In this case, the first ends 54, 64 are held together by means of a band 88 comprising a backing member 90 and adhesive layer 92 which surrounds the ends and is secured to each by means of the adhesive layer. The width of such a band, i.e. the distance the band extends inwardly from the ends of planar members 48, 58, will depend somewhat upon the material of construction of members 48, 58, the length thereof, and their inherent flexibility. The members 48, 58 should be of such a length that, when tab 78 is pulled, the slidable member 46 can move outwardly a sufficient distance that the back edge of the cassette will clear the edges of the open front of the protective jacket so as to enable one to readily grasp the cassette with one's thumb and finger. The longer the length that the members 48, 58 are, in general, the greater the distance that the cassette 12 can be moved forward and the less springiness the spring-like member 44 will have to retract the extraction means to its closed position. Nevertheless, such characteristic will depend not just upon length alone but also somewhat upon the material of construction and that materials inherent flexibility.

As shown in FIG. 4, the extraction means 26 is provided with an adhesive layer 94 located adjacent the lower or second end 56 of member 48 on the inner surface 50. A release member 96 is applied to the outer surface of the adhesive layer according to usual techniques which member is removed just prior to installation of the extraction means 26 in a protective jacket, as shown in FIG. 1. The extraction means in this configuration can be readily installed in the protective jacket by the manufacturer of the jacket or by the video enthusiast in retrofitting other jackets earlier aquired.

Figure 6:
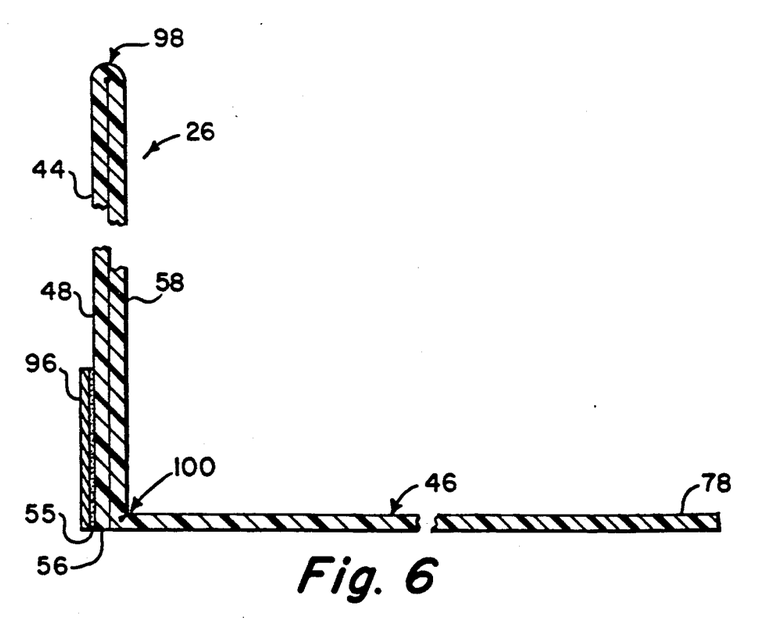
FIG. 6 is a side view in cross-section of an extraction means according to a further aspect of the invention.

Referring now to FIG. 6 of the drawing there is disclosed still a further construction of an extraction means 26 according to another, even more preferred, aspect of the invention. Importantly, the difference between this embodiment of the invention and those disclosed in FIGS. 1–5 is that the extraction means 26 shown in FIG. 6 is manufactured from a continuous length of material. Thus, the spring-like member 44 is a predetermined length of suitable material folded upon itself, providing the planar members 48, 58, also of predetermined length. The planar members 48, 58 are connected together at the fold identified by reference numeral 98. The length of material is again folded at a suitable angle, as indicated by reference numeral 100, to provide the slidable member 46.

The extraction means 26 can be constructed of various materials, e.g. plastic, metal, wood lamina, coated paper, etc. or a combination thereof. In the most preferred aspects of the invention, the spring-like component should be, as earlier disclosed, characterized by the desired flexibility. Thus, the members 48, 58 comprising the spring-like member 44 need have sufficient flexibility to allow them to be bent from the vertical and into a non-planar configuration as shown in the drawings. Such members, preferably, need also be characterized by memory or elasticity, i.e., their ability to return to the original upright or vertical planar disposition, and in substantial contact or closely adjacent with one another, as earlier disclosed, and against the inner surface 38, once the force causing the members 48, 58 to be bent out of shape, is removed.

Most preferably, however, the extraction means 26 will be manufactured from a thermoplastic material, e.g., polyester, polyvinyl chloride, polypropylene, etc. The preferred material is a Mylar ® polyester film about 0.1 mm thick. Such a film may be extruded according to conventional techniques from a composition that has been formulated in usual manner to give the desired flexibility. It will be appreciated that various components can be added to the plastic composition to provide any physical characteristics desired, e.g. flexibility or stiffness, elasticity, hardness, etc. Coloring agents can be added to provide a tab 78 of the desired color. The extruded film can be cut up into suitable lengths for further processing into an extraction means 26 according to the invention. This can be achieved by various techniques as disclosed by the drawings. Two somewhat different constructions of an extraction means according to the invention are shown in FIGS. 1-3 and 4-5, and FIG. 6. Nevertheless, in all of the various structures disclosed, the members 48, 58 are connected together at their one ends and free to move relative to one another at their second ends. The connection is accomplished by independent fastening means, in the one case, an adhesive, and in another case, an adhesive band or by a fold in the material. Nevertheless, as will be appreciated by those skilled in the art, other fastening means than adhesive or the adhesive band can also be used to accomplish the same purpose. The connection means used will depend somewhat upon the material of construction of the extraction means. For example, the one end of members 48, 58 may be fastened together by rivets which extend through both members. Or, the ends may be snap-fastened together as conventionally done in plastic mounts for photographic slides, e.g., a plurality of protrusions provided on one surface at the end of one of the components and matching openings being provided in the other component at its one end.

The most preferred extraction means 26 will be constructed of one piece, e.g., a single predetermined length of flexible metal strip or plastic film. The more preferred material is a flexible plastic film as such will offer economics in manufacture and ease in production of the extraction means by various techniques well known to those skilled in the art. Thus, a suitably flexible polyester film having a thickness of about 0.1 mm and being about ⅜Δ wide can be extruded and then cut into lengths of about 12″, the one end being straight and the other end being rounded. A length of film, measured from the straight end, about 3.5″ long, is then folded upon itself and the fold is then heated to form a permanent bend or crease in the thermoplastic film as shown by reference numeral 98 in FIG. 6. Thus, the spring-like member 44 is formed. The spring-like member is then folded against the remaining length of the film, i.e., the rounded end portion and the fold is heated whereby to form an angle of about 90 degrees between the second end of member 58 and the pull or slide member 46. Accordingly, the slide member 46 is integrally formed with the spring-like component. It will be appreciated by those skilled in the art, however, that, instead, a suitable width of preformed film may be folded upon itself to form the spring-like member, the fold heated to form the crease 98, and the film then again folded and heated to form the bend 100, after which the width of film is cut into a plurality of narrower widths of about ⅜ inch, to provide a plurality of extraction means 26. An adhesive layer comprising a pressure-sensitive adhesive, as disclosed in FIG. 4 and release layer can be applied during manufacture of the extraction means 26 according to conventional techniques or adhesive can be applied to the extraction means at the time of installation, as desired.

The invention has been particularly described with respect to the easy extraction of video cassettes from their closely-fitted storage jackets. Nevertheless, it will be readily appreciated that the invention in its broader aspects is not so limited. The extraction means of this invention will facilitate the removal of any object from a close fitting jacket or enclosure having an open face and of such a construction that makes difficult the grasping of the object with one's fingers for removal of the object from the storage jacket. Thus, audio cassettes can be, if desired, packaged and sold in a rectangular-shaped protective jacket having an opening like that of the video cassette jackets now conventionally used, rather than in the containers or boxes, as they are presently now marketed. Such a protective jacket will offer economies not believed now realized in packaging of the audio cassettes, to be purchased by the consumer. With such a protective jacket, moreover, the consumer can store a plurality of audio cassettes in a storage device not having any dividers therein as now commonly used for defining individual storage cavities for the storing of individual audio cassettes. Thus, storage devices for audio cassettes can be provided of much simpler and more economical construction. Furthermore, a somewhat larger number of audio cassettes can be stored in a storage device without dividers but having the same overall linear dimension as that of the divided storage device. This will offer economy in storage space to the consumer.

Further, it will be readily appreciated that the invention is not limited to merely video and audio cassettes. The extraction means of the invention can be used with storage jackets for other types of cassette devices. The invention, moreover, may find application wherever a member is stored within a storage jacket and the spine or back surface of the member stored is flush with the edges of the jacket opening. Thus, among other applications, it is envisioned that the extraction means of the invention can be used with jackets for conventional corporate record books, user's guides for computer software and other educational materials such as training manuals, booklets, pamphlets, and the like.

Other modifications and changes, as will be understood by those skilled in the art, can be made in the invention and its form and construction without departing from the spirit and scope thereof. The embodiments of the invention disclosed herein are merely exemplary of the various modifications that the invention can take and the preferred practice thereof. It is not, however, desired to confine the invention to the exact construction and features shown and described herein, but it is desired to include all such as properly come within the spirit and scope of the invention disclosed.

What I claim is:

1. Means providing greater ease in extracting an object from a close fitting protective jacket therefor having an open front, said means comprising an elongated, first planar flexible member of predetermined length having a rectangular-shape defined by inner and outer planar surfaces and first and second ends parallel to one another, and a second planar flexible member having a rectangular shape defined by inner and outer planar surfaces and by first and second ends parallel to one another and being of the same predetermined length as the said first-named planar member, the said first-named planar member and the said second planar member being juxtaposed to one another so that the outer planar surface of the said first planar member is in opposition to the inner planar surface of the said second planar member, means fixedly connecting together the said first and second planar members at said first ends and leaving such free to move away from one another at their second ends, said extraction means further comprising a third elongated planar member of predetermined length having a rectangular shape and being defined by upper and lower planar surfaces and by first and second ends, said third planar member being connected at its second end to said second planar member at its second end whereby on pulling the said third planar member at its first, free end, while the said first planar member is held fast at its free end, the said first and second planar members can be separated from one another and, on release of the said free end of the said third planar member, the said first planar member and said second planar member will tend to close on one another.

2. Means according to claim 1 wherein the said planar members are of plastic.

3. Means according to claim 2 wherein the plastic is a polyester film.

4. Means according to claim 3 wherein said film has a thickness of about 0.1 mm, is about ⅜″ wide, the first and second planar members each have a length of approximately 3.5 inches, and the third planar member has a length about 4¾ inches.

5. Means according to claim 1 wherein the means fixedly connecting the first and second planar members together is an adhesive layer.

6. Means according to claim 1 wherein said means for connecting the first and second planar members together is a band surrounding the said members at their first ends.

7. Means according to claim 6 whereby said connecting means is a band of suitable material of predetermined length defined by inner and outer planar surfaces and said band surrounds the said opposed first and second planar members at their first ends and holds them in fixed position relative to one another.

8. Means according to claim 7 wherein said band is a strip of plastic adhesively secured to said planar members.

9. Means providing easy extraction of a video cassette or the like from a closely fitting rectangular-shaped protective jacket therefor defined by a rectangular-shaped end closure defined by an inner planar surface and an elongated rectangular-shaped open end opposite to said end closure, said extraction means comprising a spring-like component comprising a first rectangular-shaped planar, flexible member having a predetermined length defined by first and second ends and a predetermined width and being further defined by inner and outer planar surfaces, and a second rectangular-shaped planar, flexible member having a predetermined length and being defined by first and second ends and a predetermined width, and being further defined by inner and outer planar surfaces, said first and second members being coextensive, the said spring-like component having a closed position whereby the said first and second planar members are in juxtaposition with respect to one another so that the outer planar surface of the first planar member is substantially in contact with the inner planar surface of the second planar member, said first and second flexible, planar members being connected together at their respective first ends and free to move away from one another in diverging fashion at their respective second ends to an open position, and a third rectangular-shaped planar member of a predetermined length defined by inner and outer ends and having upper and lower planar surfaces, said third planar member being joined at its said inner end to and extending in a plane perpendicularly outwardly from the said second planar member at its said second free end when said first and second planar members are in the closed position, said third planar member defining a pull tab at its outer, free end whereby on application of a pulling force on the tab of the said third rectangular-shaped member at its outer end, while the first planar member is secured at its second end at its inner planar surface to the inner planar surface of the jacket end closure, the first and second planar members can be caused to separate from one another at their free ends to said open position, and on release of such a pulling force on the said third member, the second planar member automatically closes against the first planar member and the first planar member resumes its original planar disposition so that its inner planar surface is essentially in contact with the inner surface of the jacket end closure.

10. In a rectangular-shaped protective storage jacket for a video tape cassette, said jacket being defined by spaced-apart, parallel, planar side walls each of the same predetermined length and width, each side wall defining parallel top and bottom side edges intersected by parallel front and rear end edges, parallel spaced-apart, planar top and bottom members each of the same predetermined width and length and having top and bottom planar surfaces, and each defining parallel side and front and rear end edges, said top and bottom members being in planes perpendicular to those planes defined by the said planar side walls, the said side edges of the top and bottom members intersecting and being connected to respective side walls at their said top and bottom side edges, the said side edges of the planar side walls and the said side edges of the said top and bottom members being coextensive in length, a rectangular-shaped planar closure member of predetermined length and width defining parallel side edges and parallel upper top and lower end edges, the said side edges of the closure member being of the same length as the said end edges of the said side walls, said closure member defining a plane which lies in perpendicular disposition to the planes defined by the said side walls and said top and bottom members, said side edges of the said closure member intersecting with and being connected to respective side walls at their rear end edges, and the said end edges of the closure member intersecting with and being connected to the end edges of respective top and bottom members, whereby a rectangular-shaped internal storage cavity is defined for protective storage of the said video cassette, said planar closure member being further defined by an inner planar surface and an outer planar surface, the improvement comprising in combination with said protective jacket a means providing easy extraction of a video cassette from the said storage cavity, said extraction means comprising a spring-like component comprising a first rectangular-shaped planar, flexible member of predetermined length and width having an inner planar surface and an outer planar surface, and being defined by first and second ends, and a second rectangular-shaped planar, flexible member of the same predetermined length and width as the said first planar, flexible member having an inner and outer planar surface and being defined by first and second ends, said first and second planar members being fixedly connected together at their said first ends in such manner that the outer planar surface of the said first member is opposed to the inner planar surface of the said second member, said first planar member being fixedly secured to the said inner surface of the closure member at its lower end edge, and a third member of planar rectangular shape extending outwardly from said second planar member at its free end in a plane in a predetermined angle with respect to the plane defined by the said second member, said third planar member having an upper planar surface and a lower planar surface, the said third planar member having its lower planar surface in opposition to the upper planar surface of the said bottom member and being capable of sliding engagement therewith.

11. Means providing greater ease in extracting an object from a close fitting protective jacket therefor having an open front, said extraction mans comprising an elongated, first planar flexible member of predetermined length defined by inner and outer planar surfaces and first and second ends, and a second planar flexible member defined by inner and outer planar surfaces and by first and second ends and being of the same predetermined length as the said first-named planar member, the said first-named planar member and the said second planar member being coextensive and juxtaposed to one another so that the outer planar surface of the said first planar member is in opposition to the inner planar surface of the said second planar member, said first and second planar members being fixedly connected together at said first ends, the members being free to move away from one another at their second ends, said extraction means further comprising a third elongated planar member of predetermined length being defined by upper and lower planar surface and by first and second ends, said third planar member defining a plane perpendicular to that defined by the second planar member and being connected at its second end to said second planar member at its second end whereby on pulling the said third planar member at its free first end, while the said first planar member is held fast at its fee, second end, the said first and second planar members can be separated from one another and, on release of the said free end of the said third planar member, the first planar member and said second planar member will tend to close on one another.

12. means according to claim 11 wherein the first and second planar members are each characterized by their ability to return to their original planar shape once a force causing the members to be bent into a curved shape is removed.

13. Means according to claim 12 wherein the said planar members are of plastic.

14. Means according to claim 13 wherein the plastic is a polyester film.

15. Means according to claim 14 wherein the first and second planar members are defined by a continuous length of polyester film and such members are connected together at their first ends by a fold.

16. Means according to claim 15 wherein the fold provides a permanent bend in the continuous length of plastic film.

* * * * *